United States Patent [19]

Nishikawa

[11] Patent Number: 4,651,295
[45] Date of Patent: Mar. 17, 1987

[54] ELECTRONIC DESK-TOP CALCULATOR

[75] Inventor: Hiroshi Nishikawa, Tokyo, Japan

[73] Assignee: Canon Kabushiki Kaisha, Tokyo, Japan

[21] Appl. No.: 883,866

[22] Filed: Jul. 14, 1986

Related U.S. Application Data

[63] Continuation of Ser. No. 547,255, Oct. 31, 1983, abandoned.

[30] Foreign Application Priority Data

Nov. 8, 1982 [JP] Japan .................................. 57-194759

[51] Int. Cl.$^4$ .............................................. G06F 3/02
[52] U.S. Cl. .................................................. 364/709
[58] Field of Search ..................... 364/700, 706, 709

[56] References Cited

U.S. PATENT DOCUMENTS

| | | | |
|---|---|---|---|
| 3,593,313 | 7/1971 | Tomaszewski et al. | 364/706 |
| 4,121,760 | 10/1978 | Cochran et al. | 364/700 |
| 4,242,675 | 12/1980 | Boone et al. | 364/700 |
| 4,272,826 | 6/1981 | Deutsch | 364/709 |
| 4,334,279 | 6/1982 | Miyakoshi et al. | 364/709 |
| 4,347,579 | 8/1982 | Matsuyama | 364/709 |
| 4,352,161 | 9/1982 | Hirano et al. | 364/706 |
| 4,381,554 | 4/1983 | Reach et al. | 364/706 |

*Primary Examiner*—Archie E. Williams
*Assistant Examiner*—Dale M. Shaw
*Attorney, Agent, or Firm*—Fitzpatrick, Cella, Harper & Scinto

[57] ABSTRACT

There is disclosed a desk-top calculator in which processing of numeric data in a memory is controlled in accordance with an input order or a combination of information.

8 Claims, 3 Drawing Figures

FIG. 3

| STEP | KEY OPERATIONS | | DISPLAY | COMMENTS |
|---|---|---|---|---|
| A1 | 10 000 | M | 10 000. | STORE 10 000 IN MEMORY REGISTER |
| A2 |  | + | 10 000. |  |
| A3 | 2 500 | = | 12 500. |  |
| B1 |  | M | 10 000. | READ OUT OF MEMORY REGISTER |
| B2 |  | + | 10 000. |  |
| B3 | 50 000 | = | 60 000. |  |
| C1 |  | M | 10 000. | READ OUT OF MEMORY REGISTER |
| C2 |  | + | 10 000. |  |
| C3 | 12 300 | = | 22 300. |  |

ELECTRONIC DESK-TOP CALCULATOR

This application is a continuation of application Ser. No. 547,255, filed Oct. 31, 1983, now abandoned.

BACKGROUND OF THE INVENTION

1. Field of the Invention

The present invention relates to an electronic desk-top calculator and more particularly to an electronic desk-top calculator which carries out a memory calculation in accordance with input data, calculation information and memory control information.

2. Description of the Prior Art

In a prior art desk-top calculator of this type, input keys are commonly used as input means. The input keys are provided to enter digits to be registered, designate add, subtract, multiply or divide operations or other operations and enter information for carrying out the designated operation and memory control information. The input keys are arranged on a keyboard. Data processing of a memory is controlled in accordance with an input from the input keys, the arithmetic operation is carried out by arithmetic operation means and a result of the operation is outputted to output means such as a display.

Control operations for processing the data stored in the memory include a plurality of operations such as storing of input data to the memory and reading out the stored data to the arithmetic operation means. In the prior art calculator, a plurality of input keys one for each of those memory control junctions are provided.

Thus, in the memory operation, a plurality of memory control input keys must be operated and the operation of the input keys is complex and troublesome to an operator. As the number of input keys increases, a larger keyboard space is required and the size of the calculator increases and the manufacturing cost also increases.

SUMMARY OF THE INVENTION

It is an object of the present invention to provide a desk-top calculator having a memory calculation function, which is simple in key operation, has a high operability, is small in size and inexpensive to manufacture.

In order to achieve the above object, in accordance with the present invention, there is provided means for controlling memory data processing in accordance with an input order or a combination of input data, operation information and memory control information.

BRIEF DESCRIPTION OF THE DRAWINGS

FIG. 3 is a diagram for illustrating an operation in accordance with an actual key operation sequence.

DETAILED DESCRIPTION OF THE PREFERRED EMBODIMENT

Figure 1:
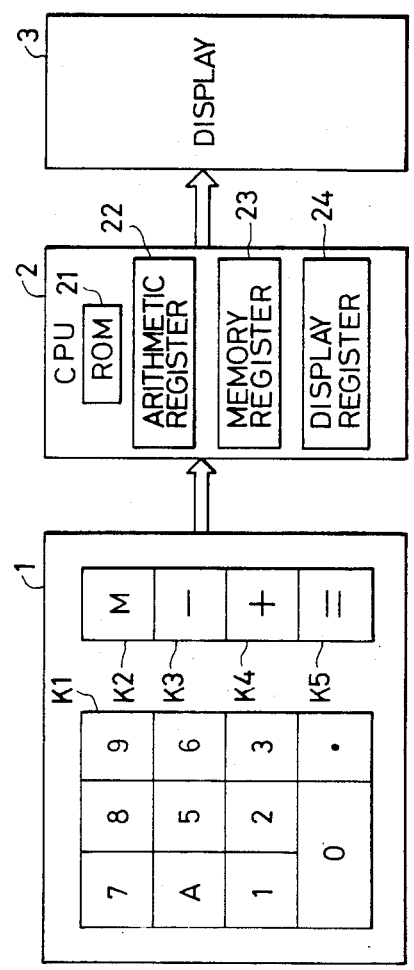
FIG. 1 shows an overall configuration of one embodiment of the present invention.

Referring to FIG. 1, a keyboard 1 for inputting a numeric data, operation information and memory control information to a CPU (central processing unit) 2, and a display 3 for displaying an output data of the CPU 2 are connected to the CPU 2.

Input keys K1–K5 are arranged on the keyboard 1. The numeric keys K1 comprise keys for digits 0–9 and a decimal point for inputting a numeric data to the CPU 2. The memory control key K2 is used to instruct the CPU 2 to store the data in a memory to be described later or read out the data stored in the memory. The keys K3–K5 are function keys for designating an operation to be executed by the CPU 2. The subtract key K3 and the add key K4 are used to designate a subtract operation and an add operation to be executed by the CPU 2. The execution key K5 is used to instruct the CPU 2 to execute the operation designated by the subtract key K3 or the add key K4.

The CPU 2 processes signals in accordance with the input signals from the input keys K1–K5, controls an overall operation by a well-known ROM and carries out various operations and outputs as a result of the operation. The CPU 2 has a fixed memory ROM 21, an arithmetic operation register 22, a memory register 23 and a display register 24.

The fixed memory ROM 21 contains a control program. The arithmetic operation register 22 is a portion of arithmetic operation means and used as a temporary memory for the operation of the input data. The memory register 23 is used to store and read out the input data. The display register 24 stores a display data such as an operation result to be displayed on the display 3. The CPU 2 has a sequence control circuit, not shown, constructed by gate circuits to carry out a control operation in accordance with the control program.

Figure 2:
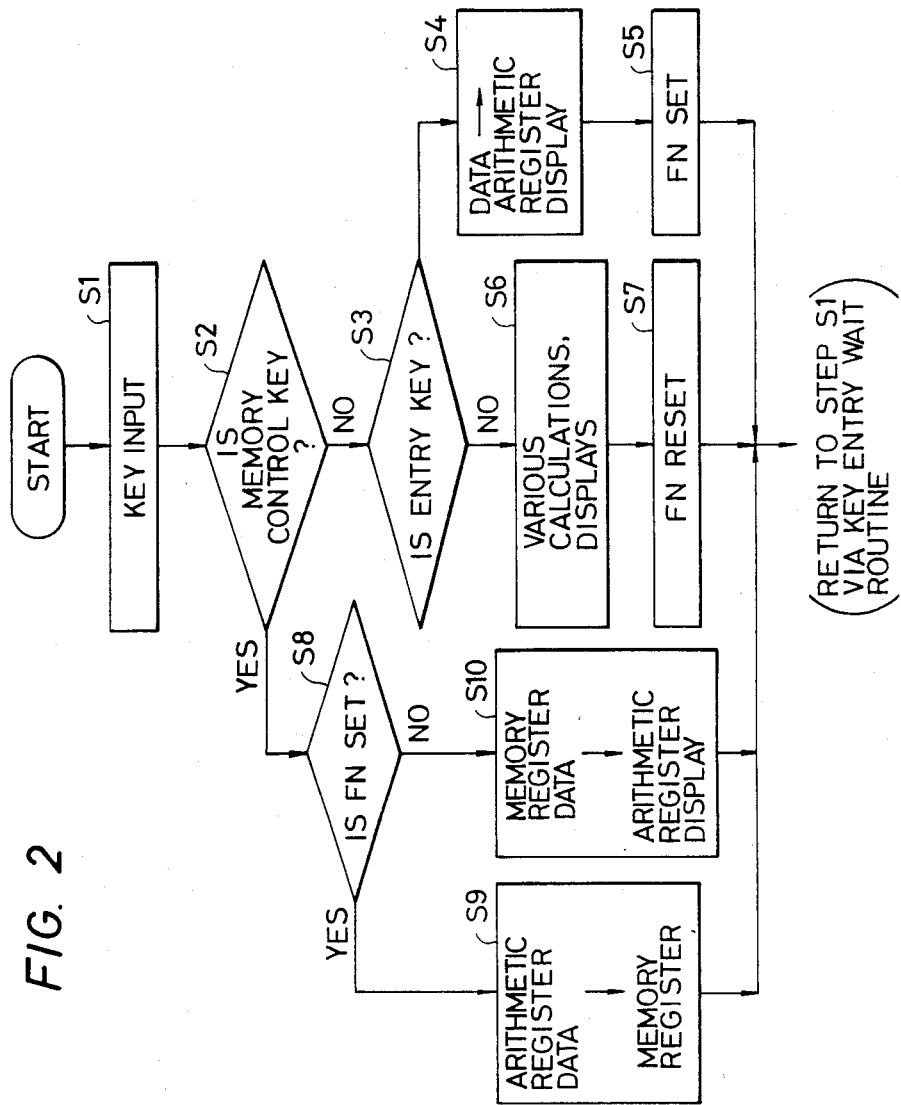
FIG. 2 is a flow chart for illustrating a control operation of a CPU.

The operation of the present embodiment is now explained with reference to FIG. 2 which is a flow chart showing a flow of the control operation of the CPU 2.

When one of the input keys K1–K5 is depressed (step S1), the CPU 2 checks whether the key input is from the memory control key K2 or not (step S2).

If it is not the input from the memory control key K2, the CPU 2 checks if it is the input from the numeric keys K1 (step S3).

If it is the input from the numeric keys K1, the CPU 2 stores the input data to the arithmetic operation register 22 and transfers the input data to the display register 24 to display it on the display 3 (step S4). The CPU 2 further sets a flag FN to indicate that the numeric data has been entered (step S5). Then, the process returns to the step S1 through a key input wait routine.

If the decision in the step S3 is No, that is, of the input is not from the numeric keys K1 but from the function keys K3–K5, the CPU 2 determines or carries out the operation in accordance with the designation or the instruction by the key input and displays the operation result data on the display 3 through the display register 24 (step S6).

The CPU 2 further resets the flag to indicate that the input from the function keys K3–K5 has been entered (step S7). Then, the process returns to the step S1 through the key input wait routine.

When the key input in the step S1 is from the memory control key K2 and the decision in the step S2 is YES, the CPU 2 checks if the flag FN is set or not (step S8).

If the flag FN is set, that is, if the input from the memory control key K2 is entered after the input from the numeric keys K1, the CPU 2 transfers the data inputted by the numeric keys K1 and stored in the arithmetic operation register 22 to the memory register 23 and stores it therein (step S9). Then, the process returns to the step S1 through the key input wait routine.

If the flag FN is reset in the step S8, that is, if the input from the memory control key K2 is entered after the input from the function keys K3–K5, the CPU 2 reads out the data stored in the memory register 23 and transfers it to the arithmetic operation register 22 and to the display register 24 to display it on the display 3 (step S10). Then, the process returns to the step S1 through the key input wait routine.

One operation of the present embodiment in accordance with a specific key operation sequence is now explained with reference to FIG. 3.

In a first key operation step A1 of FIG. 3, a numeric data "10000" is entered by depressing the numeric keys K1 (steps S1–S5 in FIG. 2), and when the memory control key K2 is depressed, the data is stored in the memory register 23 (steps S1, S2, S8 and S9). The data "10000" is also displayed on the display 3.

In a step A2, when the add key K4 is depressed the add operation is designated (steps S1, S2, S3, S6 and S7). The display remains as "10000".

In a step A3, a numeric data "2500" is entered by depressing the numeric keys K1 (steps S1–S5), and when the execution key K5 is depressed, the previous input data "10000" and the current input data are added together and a sum "12500" is displayed (steps S1, S2, S3, S6 and S7).

In a step B1, when the memory control key K2 is depressed, the data "10000" stored in the memory register 23 is read out and transferred to the arithmetic operation register and to the display register to display it (steps S1, S2, S8 and S10).

In a step B2, when the add key K4 is depressed, the add operation is designated (steps S1, S2, S3, S6 and S7). The display remains as "10000".

In a step B3, a numeric data "50000" is entered by depressing the numeric keys K1 (steps S1–S5), and when the execution key K5 is depressed, the read data "10000" and the input data "50000" are added together and a sum "60000" is displayed (steps S1, S2, S3, S6 and S7).

In steps C1–C3, similar operations to those in steps B1–B3 are carried out. By depressing the memory control key K2, the data stored in the memory register 23 is read out and the arithmetic operation is then carried out.

In summary, when the memory control key K2 is depressed following to the depression of the numeric keys K1, the numeric data is stored in the memory register 23, and when the memory control key K2 is depressed following to the depression of the function keys K3–K5, the numeric data stored in the memory register 23 is read out.

In the present embodiment, the memory control function of the same input key (memory control key K2) is set to one of a plurality of memory functions (store of the data to the memory and the read out of the data from the memory) in accordance with the key operation sequence or the key input order. Alternatively, any one of memory control functions can be set by the order or the combination of other key inputs.

For example, a predetermined memory calculation such as scale-of-60 calculation can be carried out by the memory register is response to a predetermined number of times of entry of the decimal point from the decimal point key.

While the add operation using the memory has been merely shown in the above embodiment for the sake of simplification of the description, the present invention can be applied to the subtract operation, multiply operation and divide operation or other operation using the memory.

As described hereinabove, in accordance with the present invention, the desk-top calculator having the memory calculation function is provided with the means for controlling the processing of the numeric data in the memory in accordance with the input order or the combination of the numeric data, arithmetic operation information and memory control information. Accordingly, a single memory control key or other input key is provided with a plurality of numeric data processing functions. As a result, the key input operation is simplified and the operability of the calculator is improved and the number of input keys is reduced and the keyboard space is saved. Thus, a compact and inexpensive calculator is provided.

What I claim is:

1. A calculator, comprising:
    (a) numerical key means (K1) for inputting numerical data;
    (b) function key means (K5) for inputting an instruction to execute an arithmetic operation;
    (c) operation means (22) for performing an arithmetic operation on the numerical data in response to the instruction;
    (d) data save memory (23) for saving data therein, the data being not accessed by said operation means during an arithmetic operation;
    (e) memory control key (K2) for inputting memory control data, said memory control key being a single data source; and
    (f) control means (2, 21) for saving the numerical data in said data save memory when the memory control data is input, through said memory control key, following the input of the numerical data, and for transferring the numerical data saved in said data save memory to said operation means, so as to perform an arithmetic operation, when the memory control data is input, through said memory control key, following the input of the instruction.

2. A calculator according to claim 1, wherein said operation means includes an operation register which temporarily stores the numerical data input by said numerical key means, the data stored in said operation register being processed by said operation means.

3. A calculator according to claim 2, wherein said control means transfers the numerical data from said operation register to said data save memory.

4. A calculator according to claim 1, further comprising display means (3, 24) for displaying the numerical data input by said numerical key means or the result of the arithmetic operation by said operation means.

5. A calculator, comprising:
    first input means for inputting information, including numeric data and arithmetic operation information;
    memory means for storing the numeric data;
    second input means for inputting memory control information, said second input means being a single input key means for inputting the memory control information;
    process means for processing the numeric data and producing a result therefrom;
    output means for outputting the result of the processing; and
    control means for storing the numeric data in said memory means when the memory control information is input, through said second input means, following the input of numeric data, and for transferring the numeric data stored in said memory means to said process means when said memory control information is input, through said second input means, following the input of the arithmetic operation information.

6. A calculator according to claim 5, wherein said process means includes an operation register which temporarily stores the numeric data input by said first input means, the data stored in said operation register being processed by said process means.

7. A desk-top calculator, comprising:
first input means for inputting numerical information;
second input means for inputting memory control information, said second input means being a single input key means;
third input means for inputting arithmetic operation information;
memory means for storing the numerical information;
arithmetic operation means for performing an arithmetic operation on the numerical information;
output means for outputting a result of the arithmetic operation; and
control means for storing the numerical information in said memory means when the memory control information is input, through said second input means, following the input of the numerical information, and for transferring the numerical information stored in said memory means to said arithmetic operation means, so as to perform the arithmetic operation, when the memory control information is input, through said second input means, following the input of the arithmetic operation information.

8. A desk-top calculator according to claim 7, wherein said arithmetic operation means includes an operation register which temporarily stores the numerical information input by said first input means, the information stored in said operation register being processed by said arithmetic operation means.

* * * * *